June 28, 1966 E. O. OHSOL 3,257,754
PLANTING SEEDS IN A SKIN FOAM SHEET
Filed May 14, 1964
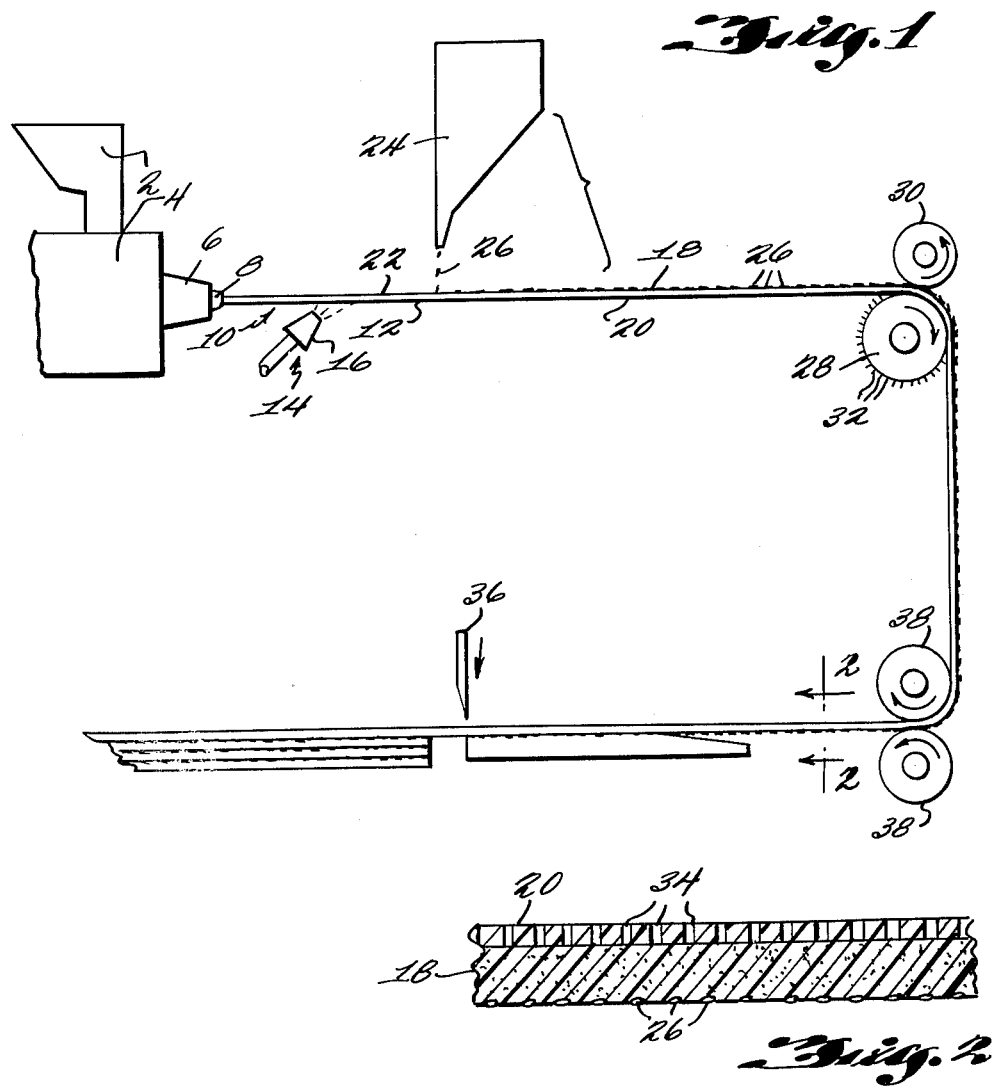
INVENTOR
ERNEST O. OHSOL
BY 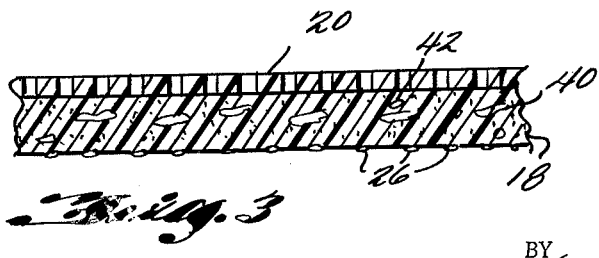
ATTORNEYS United States Patent Office 3,257,754
Patented June 28, 1966

3,257,754
PLANTING SEEDS IN A SKIN FOAM SHEET
Ernest O. Ohsol, Wilmington, Del., assignor to Haveg Industries, Inc., a wholly-owned subsidiary of Hercules Powder Company, New Castle, Del., a corporation of Delaware
Filed May 14, 1964, Ser. No. 367,491
8 Claims. (Cl. 47—56)

This invention relates to a novel seed carrier and in particular to a seed carrier which permits uniform growth of the seed and more particularly which enables control of the type of growth in the soil on which it is used.

In the broadcasting of seed for crops and in particular for the growth of grass, the seeds are normally broadcast upon the ground and raked in or rolled so that they are established in comingled relationship with the top soil of the area planted. This method of planting grass results in an irregular and uneven distribution of the seed. Moreover, this method of seed planting results not only in burying substantial amounts of seed in the soil at depths which make it impossible for the seed to germinate but it also results in leaving substantial amounts of the seed on the ground surface where they are destroyed by the sun's rays. Additionally, this method of seed planting is not selective, i.e. extraneous seeds are often introduced into the same soil which result in the growth of, for instance, undesirable crabgrass. For effective seed planting it has been found that the broadcasting of seed should be accompanied by an even distribution of growing media, fertilizer and other adjuncts. Furthermore, it is essential that the seed thus planted be provided with a protective cover to control the type of seed growth as well as to control the moisture to which the seed is exposed. In order to provide a convenient form of materials so that these results can be obtained with the minimum of field operations, and that the materials can be stored, transported and applied with the greatest convenience, this invention presents an improved device for such purposes. This invention also provides a novel process of producing this device.

This invention contemplates a foamed sheet of plastic material provided at the bottom portion, i.e. adjacent the ground engaging surface thereof with seed, the opposing surface of said foamed sheet having a skin, said seed being substantially superposed by perforations in said skin.

It is therefore a principal object of his invention to provide a relatively inexpensive means for regular and even distribution of seeds to the subjacent soil.

Another object of this invention is to provide means which will serve to retain heat below it and to control and maintain the moisture in the ground.

A further object of this invention is to provide a shield for sunlight to retard the destruction of seed and to discourage the growth of undesirable weeds or crabgrass in the area to which the device of this invention is applied.

A still further object of this invention is to provide an economical foamed material suitable for planting seeds.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be obtained if there is employed as the planting device a foamed core having integrally united thereto a nonporous, tough outer skin, the core being provided with seed adjacent its ground engaging surface, said seed being superposed by perforations in said trough outer skin.

The foamed core should contain at least 5.0% solids. The void space can be between 25 and 95%. Generally, the foamed core should be at least ¼ inch thick while the impervious skin can be $\frac{1}{16}$ inch thick. Preferably the skin is at least 0.01 inch. The total thickness of the skin should not be more than half the thickness of the entire foamed sheet (i.e. the foamed core plus skin) and the foamed core is normally 50 to 95% of the total thickness of the foamed sheet.

Various polymers can be used to form the foamed thermoplastic sheet from which the planting device is made.

For instance, homopolymers and interpolymers of monomeric compounds containing the $CH_2=C<$ grouping such as olefins, e.g. ethylene, propylene, isobutylene, butene-1; vinyl halides, e.g. vinyl chloride and vinyl fluoride, vinylidene chloride; vinylesters of carboxylic acids, e.g. vinyl acetate, vinyl stearate, vinyl benzoate; vinyl ethers, e.g. vinyl methyl ether, vinyl ethyl ether, vinyl isobutyl ether; chlorotrifluoroethylene, tetrafluoroethylene and hexafluoropropylene can be used.

While the invention is also of particular value with foams of polyethylene and polypropylene it is equally advantageous to employ foams of ethylene-propylene copolymers (e.g., a 50—50 copolymer by weight), having incorporated therein a paraffinic oil, e.g. a hydrocarbon oil containing 5 to 20 carbon atoms.

Preferably the above type polymers are modified with with relatively volatile plasticizers such as dibutyl phthalate, dihexyl phthalate, dibutyl sebacate, tributyl phosphate, tricresyl phosphate, dioctyl adipate, dioctyl sebacate, di-octyl phthalate and di-2 ethylhexyl phthalate.

Other polymeric materials include, for instance, copolymers of unsaturated carboxylic acids and derivatives thereof, e.g. acrylic acid, methacrylic acid, methyl acrylate, methyl alpha chloroacrylate, methyl methacrylate, ethyl acrylate, ethyl methacrylate, acrylamide, acrylonitrile, methacrylonitrile and interpolymers of the above-mentioned vinylidene monomers with alpha, beta-unsaturated polycarboxylic acids and derivatives thereof, e.g. maleic anhydride, diethyl maleate, dibutyl fumarate, diallyl maleate, dipropyl maleate, etc.

In addition to polystyrene there can be employed polymers of o-chlorostyrene, p-chlorostyrene, 2,5-dichlorostyrene, 2,4-dichlorostyrene, p-methylstyrene, p-ethystyrene and α-methylstyrene.

When employing polystyrene there can be employed normal crystal grade polystyrene or high impact polystyrene or a mixture containing 5 to 95% normal crystal grade polystyrene and the balance high impact polystyrene. When employing a thermoplastic styrene polymer it normally contains greater than 50% by weight of styrene and preferably at least 70% by weight of styrene in its structure. Preferably, the polystyrene is at least 10% high impact polystyrene. High impact polystyrenes are frequently prepared by polymerizing monomeric styrene in the presence of 2 to 15% by weight of a rubbery diene polymer or by polymerizing styrene in the presence of such amounts of a difunctional material. Examples of high impact styrene include a terpolymer of 5% acrylonitrile, 5% butadiene and 90% styrene; a copolymer of 5% butadiene and 95% styrene; the product made by polymerizing 95% of styrene in the presence of 5% of polybutadiene; a copolymer of 5% chlorosulfonated polyethylene and 95% styrene; a blend of 97.5% polystyrene and 2.5% polybutadiene; a blend of 95% polystyrene and 5% hydrogenated polybutadiene containing 35.4% residual unsaturation; polystyrene formed in the presence of 5% hydrogenated polybutadiene containing 4.5% of residual unsaturation, a blend of 95% polystyrene and 5% polyisoprene, a blend of 98% polystyrene with 2% rubbery butadiene-styrene copolymer, a blend of 85% polystyrene with 15% rubbery butadiene-styrene copolymer, and a copolymer of 99.5% styrene and 0.5% divinyl benzene.

A preferred class of materials with which optimum results are obtained are rigid, relatively nonelastic, thermoplastic resins such as homopolymers and interpolymers of vinyl chloride, e.g. polyvinyl chloride, vinyl chloride-vinyl acetate copolymer (87:13), vinyl chloride-acrylonitrile copolymer (80:20), homopolymers of vinylidene aromatic hydrocarbons and ring halogenated derivatives thereof, e.g., styrene, o-chlorostyrene, p-chlorostyrene, 2,5-dichlorostyrene, 2,4-dichlorostyrene, p-methylstyrene, p-ethylstyrene, alpha-methylstyrene, cumarone, indene, vinyl naphthalene and interpolymers of such vinylidene monomers with each other and with other vinylidene monomers in which the interpolymer contains at least 70% of the vinylidene aromatic hydrocarbon compound, e.g., a copolymer of 70% styrene and 30% acrylonitrile. As previously indicated, for many uses the most preferred resins are thermoplastic styrene polymers containing at least 70% by weight styrene in the structure.

Other suitable thermoplastic resins include polycarbonates, e.g., the polymer from bisphenol A and diphenyl carbonate; polyoxymethylene (Delrin), oxymethylene-alkylene oxide copolymers, e.g., oxymethylene-ethylene oxide (95:5), polyurethanes, e.g., prepolymers from toluene diisocyanate and polypropylene gylcol molecular weight 2025; or glycerine-propylene adduct molecular weight 3000, butanediol 1,4-adipic acid polyester; Dacron (polyethylene terephthalate), nylon (e.g., polymeric hexamethylene adipamide). ABS terpolymers can be used, e.g., the terpolymer of 25% butadiene, 15% acrylonitrile and 60% styrene (a rigid ABS terpolymer), as well as other terpolymers containing 25 to 60% butadiene, 10 to 20% acrylonitrile, and 20 to 60% styrene.

The present invention is of particular value in preparing foamed articles from polyethylene (of high density, e.g., 0.960, medium density, e.g., 0.935 or low density, e.g., 0.914), polypropylene, copolymers of ethylene and propylene (e.g., 50:50 copolymer, 60:40 copolymer and 20:80 copolymer), regular or high impact polystyrene, acrylonitrile-butadienestyrene terpolymer, polyvinyl chloride (preferably rigid polyvinyl chloride), copolymers of ethylene with minor amounts of butent-1 (e.g., 90:10 and 97.5:2.5); terpolymers, ethylene, propylene and up to 5% of a nonconjugated polyolefins such as alloocimene, pentadiene-1,4 and dicyclopentadiene, e.g., a terpolymer of 60% ethylene, 39% propylene and 1% alloocimene or pentadiene 1,4.

There can also be prepared foamed articles from fluorocarbon polymers such as polytetrafluoroethylene, polyhexafluoroethylene and tetrafluoroethylene hexafluoropropylene copolymer (e.g., 50:50).

Unless otherwise indicated, all parts and percentages are by weight.

To insure the formation of a uniform foamed plastic core, a nucleating agent should be used in forming the foamed sheet.

When a nucleating agent is employed, it is used in an amount of from 0.02 to 10% of the total polymeric material by weight. Preferably, 0.4 to 2% of the nucleating agent is used.

Conventionally, the nucleating agents are made up of two materials which react to form carbon dioxide and water. The two materials are normally used in approximately equivalent amounts. As the carbon dioxide liberating materials there can be used ammonium, alkali and alkaline earth carbonates or bicarbonates, e.g. ammonium bicarbonate, sodium bicarbonate, sodium carbonate, potassium bicarbonate and calcium carbonate. The other material is an acid or acid-reacting salt, preferably solid, which is sufficiently strong to liberate the carbon dioxide from the carbonate or bicarbonate. Generally, the acid has at least 3.0 milliequivalents of acidic hydrogen, and preferably at least 10.0 milliequivalents per gram. The acid can be organic or inorganic. Suitable acidic materials include boric acid, sodium dihydrogen phosphate, fumaric acid, malonic acid, oxalic acid, citric acid, tartari acid, potassium acid tartrate, chloroacetic aid, maleic acid, succinic acid and phthalic acid. In place of the anhydrous acids or salts there can be used the solid hydrates, e.g. oxalic acid dihydrate and citric acid monohydrate.

While not essential, there can also be added a wetting agent such as Bayol 35 (a petroleum aliphatic hydrocarbon white oil), kerosene having an average of at least 8 carbon atoms in the molecule, alkylphenolalkylene oxide adducts, e.g. Triton X–100 (t-octylphenol-ethylene oxide adduct having 10 ethylene oxide units in the molecule), sodium lauryl sulfate and sodium dodecylbenzene sulfonate. The wetting agent can be nonionic or anionic.

One mode of incorporating the foaming agent into the polymer is by premixing the pelletized, solid, thermoplastic polymer with a minor amount of an absorbent having absorbed thereon a volatile liquid, (i.e., the foaming agent) which is non reactive with and which has not more than a single solvent action on the polymer. The volatile liquid should volatilize below the softening point of the polymer.

As the absorbent there can be employed any conventional absorbent in finely divided form, such as diatomaceous earth (Celite), Fuller's earth, silica gel, e.g. Cab-O-Sil and Hi-Sil, activated alumina, molecular sieves, attapulgus clay and activated carbon. The absorbent is usually used in an amount of 0.1 to 15%, preferably 0.5 to 10% by weight of the polymer, although up to 25 or 30% of absorbent can be employed. The absorbent is an inert filler of large surface area but small particle size, e.g. 200 mesh or below.

As the volatile liquid there can be used aliphatic hydrocarbons boiling between 10° and 100° C. and preferably between 30° and 90° C., e.g. petroleum ether (containing primarily pentane or hexane or a mixture of these hydrocarbons), pentane, hexane, isopentane, heptane, cyclohexane, cyclopentane, pentadiene and neopentane. Other volatile liquids include methanol, ethanol, methyl acetate, ethyl acetate, butane, acetone, methyl formate, ethyl formate, dichloroethylene, perchloroethylene, dichlorotetrafluoroethane, isopropyl chloride, propionaldehyde, diisopropyl ether, dichlorodifluoromethane, a mixture of pentane with 5 to 30% of methylene chloride or other volatile lower halogenated hydrocarbon.

The amount of volatile liquid absorbed on the absorbent can vary from 5 to 150% or more based on the weight of the absorbent. The amount of liquid absorbed will depend upon the capacity of the absorbent for the particular liquid. Normally, the absorbent containing the volatile liquid will appear to be a dry powder. The volatile liquid employed should be one which is nonreactive with the particular polymer employed. Usually, the amount of volatile liquid will be 0.1 to 15% by weight of the polymer, e.g., polyvinyl chloride, to be expanded. The amount of volatile liquid will depend on the extent of foaming desired. In general, the greater amount of absorbed volatile liquid in the polymer-absorbent mixture, the more the expansion. It has been found that good expansion can be obtained using very small amounts of the volatile liquid.

Instead of absorbing the volatile liquid on a filler, there can be employed conventional expansible thermoplastic materials such as expansible polystyrene containing 1 to 9% of one of the volatile liquids, e.g. Dow-Pelespan 101 (expansible polystyrene beads containing 6% pentane).

The free-flowing powder consisting of the low boiling solvent or semi-solvent absorbed on the inert filler of large surface area is added to the extrusion grade plastic pellets, preferably along with the nucleating agent, and tumbled in a mixer. The powder containing the volatile blowing agent will then disperse uniformly throughout the mixture while adhering to the plastic pellets. The mixture is then fed into the hopper of an extruder.

The foamed sheet is then formed by extruding a hot sheet of foamable thermoplastic resin composition, rapidly chilling the outer or inner surface of the sheet to prevent expansion thereof and to form an outer or inner skin while permitting the still warm core of the sheet to expand. There is thus obtained a non-porous, impervious tough integral skin united to the foam. The chilling can be done with an air blast, an air-water mist, argon, helium or other inert fluid.

Chilling is conveniently carried out with an air or air-water mist at a flow rate of 40 to 100 ft./sec. and at 0 to 100° F. The sheets formed can have a thickness up to one inch or even more.

The foamed plastic usually has a density of 7.5% to 75% of the density of the unfoamed polymer, preferably 18% to 50% of such density. With polyvinyl chloride polymers, it has been found desirable to have a density for the foam of between 6.0 and 60 lbs./cu. ft., preferably between 10 and 35 lbs./cu. ft. The skin is essentially unexpanded and has a considerably higher density than the foamed core, e.g. it can have a density of 75 to 83 lbs./cu. ft. with a material such as polyvinyl chloride having a density of 83.3 lbs./cu. ft.

The extrusion is carried out at conventional temperatures, e.g. 100 to 300° C. Of course the extrusion temperature chosen will depend on a number of factors such as the choice of the particular polymeric material.

Immediately after extruding the foamed polymeric material, seed can be applied to the inner surface, i.e. the surface opposite the unfoamed skin surface. Any conventional method of applying the seed can be employed, i.e. by spraying, dipping, coating, etc. The seed employed can be any of the commonly known agricultural seeds, for instance, grass, wheat, corn, sorghum, etc.

Moreover, fertilizers, nutrients and insecticides can be provided to the foamed core prior to or subsequent to the foaming procedures. In the former instances, they can be incorporated into the foamable mixture or, alternatively, can be sifted into the foamed core prior to or subsequent to the application of the seed to the ground-engaging surface of the foamed sheet. Conveniently, such additives as potassium nitrate, ammonium phosphate and potassium ammonium phosphate, with or without finely divided carbon to increase light absorption, can be provided to the foamed core.

The invention will be understood best in connection with the drawings wherein:

FIGURE 1 is a diagrammatic illustration of one method of forming a foamed sheet suitable for use in the agricultural planting device of the invention;

FIGURE 2 is a sectional view taken along line 2—2 of FIGURE 1;

FIGURE 3 is a modification of FIGURE 2 incorporating seed growing additives such as insecticides, fertilizers and nutrients, incorporated into the sheet material.

*Example 1*

Referring more specifically to FIGURE 1 of the drawings, there are provided pellets of a composition containing 100 parts of polyvinyl chloride plasticized with 60 parts of dibutyl phthalate, together with 0.6 part anhydrous citric acid and 0.8 part of powdered sodium bicarbonate. This composition is called hereinafter Composition A.

100 parts of Composition A were tumbled for 5 to 10 minutes with 4 parts of n-pentane absorbed on on Hi-Sil 233 (precipitated silica). The resultant mixture is hereinafter called Composition B.

Composition B was added to the hopper zone 2 of a conventional plastic screw extruder 4. The plastic mixture was then passed to the barrel of the extruder where it was softened and kneaded within the barrel with the aid of a screw at a temperature of 120 to 160° C. and a pressure of 4000 p.s.i. The plastic then entered die 6 and was extruded through slot opening 8 to form a foamed polyvinylchloride sheet 10. The bottom surface 12 of the sheet 10 was rapidly chilled by an air blast 14 at 70° F. from pressure nozzle 16 at a velocity of 60 ft./sec. As a result, there was formed a sheet having a relatively thick foamed core 18 integrally united to a lower, tenacious, relatively nonporous skin 20 (FIGURE 2). Adjacent the upper surface 22 of the sheet 10 there is provided means 24, such as a hopper, to dispense or apply grass seed 26 to the porous foamed core 18 as it emerges from the slot opening 8 of the extruder. Subsequently, the nonporous skin is rolled with perforating roll 28. Upper back-up roll 30 has a smooth surface and additionally serves to embed the grass seed 26 adjacent the upper or ground-engaging surface 22 of the foamed sheet. The perforating roll 28 was provided with needles 32 to provide uniformly spaced perforations 34 approximately ⅛ inch in diameter on ½ inch centers in the lower skin 20. Instead of the uniformly perforated effect thus produced, the perforating roll can be designed to give non-uniformly spaced perforations. The foamed sheet can, if desired, be led to cutting means 36 over guide rolls 38 where it is severed into desired lengths. Alternatively, the perforated grass seed-containing sheet can be rolled up for storage. The foamed sheet produced was 3 feet wide and after rolling with the perforating roll had a total thickness of ⅜ in. The foamed sheet had an over-all density of 12 lbs./cu. ft.

*Example 2*

The procedure of Example 1 was repeated except that the formulation employed was a mixture of 100 parts of a copolymer of methacrylic acid and methyl methacrylate (80:20) and 5 parts of n-heptane absorbed on Hi-Sil 233 (precipitated silica). The n-heptane was 50% of the total weight of n-heptane and Hi-Sil 233. The formulation also included 0.4 part of sodium bicarbonate, 0.3 part of citric acid and 0.5 part Bayol 35. The temperature within the barrel of the extruder was 400° F. and the pressure was 4500 p.s.i. The pressure within the die was 4000 p.s.i. and the sheet emerged from the slot of the die at a temperature of 400° F. The product was cooled in the same manner as Example 1. The foamed sheet had a lower nonporous, tough skin 0.01 inch thick and a foamed core 0.45 inch thick and integrally united to the skin. The foamed sheet had a density of 9 lbs./cu. ft.

*Example 3*

The procedure of Example 1 was repeated except that the formulation employed was a mixture of 100 parts polyethylene and a paraffinic oil having an aveage total carbon content of 18 carbon atoms (85:15) and 5 parts of n-heptane absorbed on Hi-Sil 233 (precipitated silica). The n-heptane was 50% of the total weight of n-heptane and Hi-Sil 233. The temperature within the barrel of the extruder was 290° F. and the pressure was 3500 p.s.i. The pressure within the die was 3000 p.s.i. and the sheet emerged from the slot of the die at a temperature of 280° F. The product was cooled in the same manner as Example 1. The foamed sheet had a lower nonporous, tough skin 0.08 inch thick and a foamed core 0.62 inch thick and integrally united to the skin. The foamed sheet had a density of 7.5 lbs./cu. ft. and the seed employed was sorghum.

*Example 4*

The procedure of Example 1 was repeated except that the formulation employed was a mixture of 100 parts of unstabilized polystyrene and 10 parts of Dow-Pelespan 101 containing 6% of pentane and 0.5 part of Bayol 35, 0.3 part of citric acid and 0.4 part of sodium bicarbonate. The temperature within the barrel of the extruder was 320° F. and the pressure was 3000 p.s.i. The pressure within the die was 2800 p.s.i. and the sheet emerged from the slot of the die at a temperature of 320° F. The product was cooled in the same manner as Example 1. The foamed sheet had a lower nonporous, tough skin 0.012 inch thick provided with nonuniform perforations and a foamed core 0.50 inch thick and integrally united to the skin. The foamed sheet had a density of 10 lbs./cu. ft. and the seed used was corn.

*Example 5*

The procedure of Example 1 was repeated except that after extrusion from the die and prior to the application of grass seed 2 lbs./cu. ft. of ammonium phosphate particles 40 and 0.2 lbs./cu. ft. of finely divided carbon particles 42 were introduced into the foamed core. The foamed sheet had a density of 14.2 lbs./cu. ft.

*Example 6*

The procedure of Example 1 was repeated except that the formulation employed was a mixture of 50 parts of pellets of high impact polystyrene (Foster Grant's Tuflex 216) polystyrene modified with 5% polybutadinene) and 50 parts of pellets of regular crystal polystyrene (Koppers Dylene 8) as Composition A.

90 parts of this Composition A were tumbled for 5 to 10 minutes with 10 parts of Dow-Pelespan 101, 0.5 part of Bayol 35, 0.3 part citric acid and 0.4 part sodium bicarbonate.

What is claimed is:

1. A foamed seed planting sheet consisting of (1) a foamed thermoplastic resin composition core, (2) a nonporous, tough, thermoplastic resin composition outer skin, said core being integrally united to said outer skin and comprising 50 to 97% of the total thickness of the sheet, said skin being made of the same resin as said core, said core provided adjacent its ground-engaging surface with seed, said outer skin provided with perforations in communication with said core and substantially superposed over said seed, said sheet being at least .120 inch thick and said skin being at least .008 inch thick.

2. A foamed seed planting sheet according to claim 1 wherein said thermoplastic resin is selected from the group consisting of vinyl chloride polymers, copolymers of acrylic acid with alkyl acrylate, polymers of a monoolefin having 2 to 4 carbon atoms and styrene polymers.

3. A foamed seed planting sheet according to claim 1 wherein said core is provided with a fertilizer.

4. A foamed seed planting sheet according to claim 1 wherein said core is provided with a nutrient.

5. A foamed seed planting sheet according to claim 1 wherein said core is provided with finely divided carbon.

6. A foamed seed planting sheet consisting of (1) a foamed polyvinyl chloride composition core plasticized with dihexyl phthalate, (2) a nonporous, tough polyvinyl chloride composition outer skin, said core being integrally united to said skin and comprising 50 to 97% of the total thickness of said sheet, said core containing adjacent its ground-engaging surface grass seed, said outer skin provided with perforations in communication with said core, said sheet being at least 0.1 inch thick, said skin being at least 0.005 inch thick, and said core containing a fertilizer.

7. The foamed seed planting sheet according to claim 6 wherein said core includes an insecticide.

8. The foamed seed planting sheet according to claim 7 wherein said core includes a nutrient.

References Cited by the Examiner

UNITED STATES PATENTS 3,080,681  3/1963  Merrill et al. _____ 47—56
3,160,986  12/1964  Watson et al. _____ 47—56

ABRAHAM G. STONE, *Primary Examiner.*

R. E. BAGWILL, *Assistant Examiner.*